UNITED STATES PATENT OFFICE.

EDWARD M. HAMILTON, OF SAN FRANCISCO, CALIFORNIA, ASSIGNOR TO HAMILTON, BEAUCHAMP, WOODWORTH, INC., OF SAN FRANCISCO, CALIFORNIA, A CORPORATION OF CALIFORNIA.

EXTRACTION OF METALS FROM THEIR ORES.

1,261,383.     Specification of Letters Patent.     Patented Apr. 2, 1918.

No Drawing.     Application filed March 14, 1917. Serial No. 154,848.

*To all whom it may concern:*

Be it known that I, EDWARD M. HAMILTON, a subject of the King of England, residing in the city and county of San Francisco and State of California, have invented new and useful Improvements in Extraction of Metals from Their Ores, of which the following is a specification.

This invention relates to the recovery of certain metals from their ores and concentrates and pertains especially to a method for the extraction of tungsten from its ores and concentrates.

The usual method of dealing with tungsten ores on a commercial scale is to obtain a concentrate high in tungsten and then to fuse or roast this concentrate with soda ash, forming a sodium tungstate. The resulting mass is then leached with water, first having been pulverized, if necessary, and the alkali tungstate, being soluble in water, is leached out.

The tungsten is afterward recovered from the liquor by addition of an acid which precipitates it in the form of tungstic acid, $H_2WO_4$. This acid is calcined, resulting in the formation of $WO_3$ which is either fused with iron in the electric furnace forming ferro-tungsten alloy or reduced to metallic tungsten by ignition with carbon.

It happens in the case of certain ores that it is impossible to obtain a concentrate high in tungsten and at the same time make a high percentage recovery of the metal in question from the ore; for instance where tungsten occurs in small quantities in ore containing a large proportion of sulfids of iron together with copper, gold and other heavy minerals, it is possible to recover by mechanical means as high as 90% of the tungsten together with most of the heavy sulfids present resulting in a concentrate containing only a few per cent. (say from 1 to 10 per cent.) of tungsten, the remainder being almost entirely sulfids or other heavy minerals. Such a product is unsuitable for treatment to recover the tungsten by any of the commercial methods now in use on the ground of expense, since it would be necessary first to roast off the sulfur and then to fuse or re-roast the large quantity of resulting material in order to recover a small amount of tungsten. On the other hand, if it is desired to make a concentrate containing a high percentage of tungsten (say from 10% to 50%) suitable for the present commercial processes of tungsten recovery, the loss of tungsten in the processes of concentration is so high as to constitute a serious source of loss of the metal, a loss which may amount to as high as 40 to 50 per cent.

The object of the present invention is to devise a process whereby a concentrate high in heavy minerals and containing a low tungsten content such as that already described, can be treated successfully and at an expense within the limits demanded for a commercial process.

*Preparation of the ore for treatment.*— My process consists of first grinding the material to be treated to a suitable degree of fineness, or otherwise preparing it so that it becomes amenable to the subsequent reactions by chemical treatment necessary. In the case of tungsten I usually grind the ore to pass a 200 mesh standard sieve, although it may not be necessary in every case to grind as fine as this.

*Reagent.*—The ore, having been suitably pulverized, is made into a pulp with water to which has been added, or to which there is later added, a suitable amount of carbonate or bicarbonate of one of the alkali metals; the amount being determined by the tungsten content of the material; it being usually advisable to have present an excess of the re-agent over the amount actually called for by the equation.

The re-agent I prefer is commercial sodium carbonate (soda ash) on account of its cheapness.

The reaction in connection with tungstate ores may be represented by the following equations:

*Scheelite.*

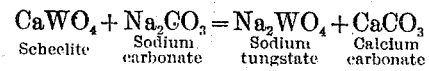

*Hubnerite.*

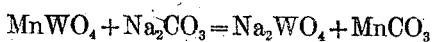

And other tungsten minerals similarly.

*Ratio of solution.*—The ratio of solution to ore in the mixture is not vital to the reaction but with low grade material it is advisable to keep it low, say between 1:1 and 2:1, both to reduce the quantity of liquor to be handled subsequently and also to obtain a higher degree of concentration of the dissolving reagent, but in the treatment of products rich in tungsten it is usually better to increase the dilution since otherwise there is a formation of large crystals of sodium tungstate which may be troublesome to dissolve during the washing out process.

*Heating.*—The pulp so formed is heated up to or above the boiling point of the solution.

The pulp is heated above the atmospheric boiling point of water by inclosing it in a receptacle such as an autoclave, capable of standing a high internal pressure and preferably fitted with means for agitating the pulp during treatment. The receptacle is heated until the internal pressure rises sufficiently high to insure a temperature of the pulp above the normal boiling point of water.

The reaction also takes place by boiling at atmospheric pressure but under these conditions the process is slow and difficult to carry to completion. The higher the temperature rises above the atmospheric boiling point of water, i. e. above 212° F., the more rapid and complete is the reaction, and I find a useful point to work at is one hundred (100) pounds pressure within the receptacle equal to a temperature of 327.9 degrees F. When this temperature has been maintained long enough to complete the reaction, which may take from one to three hours the pressure is lowered and the charge withdrawn, or what is preferable for a working plant a series of such receptacles may be used, so arranged that the pulp is pumped from one to the other and continuously discharges at the end of the series, the speed of flow being determined by the time it is found necessary to keep the ore under the influence of the heat and reagent.

*Filtering and washing.*—The pulp after being subjected to the heating process is filtered and the residue well washed with water, the resulting liquor containing the tungsten in the form of sodium tungstate.

*Precipitation from the liquor.*—Tungsten is usually recovered from its alkaline solution by addition of an acid which precipitates tungstic acid

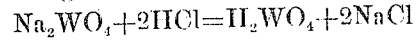

$$Na_2WO_4 + 2HCl = H_2WO_4 + 2NaCl$$

To sum up the advantages of my process:

(1) It is applicable to products of concentration low in tungsten such as it is unavoidable to make in many instances if a high recovery is to be obtained from the ore, and such as could not be profitably treated by processes at present in use.

(2) It solves the problem of the association of copper with tungsten ores.

Having thus described my invention, what I claim and desire to secure by Letters Patent is—

1. The method of recovering tungsten from its ores and concentrates which includes as a step therein, the reduction of the ore to a suitable condition of fineness and character to render it amenable to the necessary chemical re-actions herein specified, mixing the pulverized ore with water and a carbonate or bicarbonate of an alkali metal to form a pulp and to produce a soluble compound of the mineral to be recovered, heating the pulp with its reagent at a temperature above 212° F. to complete the reaction and recovering the values by precipitation.

2. The method of recovering tungsten from its ores and concentrates which includes as a step therein, the reduction of the ore to a suitable condition of fineness and character to render it amenable to the necessary chemical re-actions herein specified, mixing the pulverized ore with water, a carbonate or bicarbonate of an alkali metal to form a pulp containing a suitable reagent to produce a soluble compound of the mineral to be recovered while avoiding excessive solution of silica, the amount of the carbonate or bicarbonate being in excess over the amount actually called for theoretically, heating the pulp with its reagent at a temperature above 212° F. to complete the reaction and recovering the values by precipitation.

3. The method of recovering tungsten from its tungstate ores and concentrates which includes as a step therein, the reduction of the tungstate ore to a suitable condition of fineness and character to render it amenable to the necessary chemical re-actions herein specified, mixing the pulverized ore with water to form a pulp containing sodium carbonate to produce a soluble compound of the mineral to be recovered, heating the pulp with its reagent under pressure to complete the re-action, and recovering the values by precipitation.

4. A method of recovering tungsten from its ores or concentrates in the form of tungstic acid which consists in grinding the ore or concentrates to a suitable degree of fineness, adding water to the ground material to form a pulp, adding a carbonate or bicarbonate of an alkali metal to produce a soluble compound of tungsten, the ratio of solution to ore being approximately between 1:1 and 2:1, heating the resultant pulp under pressure until complete re-action has taken place, and finally filtering out the solution to permit addition of an acid to form a precipitate of tungstic acid.

5. A method of recovering tungsten from its ores or concentrates in the form of tungstic acid which consists in grinding the ore or concentrates to a suitable degree of fineness, adding water to the ground material to form a pulp, adding sodium carbonate to produce a soluble compound of tungsten, the ratio of solution to ore being approximately between 1:1 and 2:1, heating the resultant pulp under pressure until complete reaction has taken place, and finally filtering out the solution to permit addition of an acid to form a precipitate of tungstic acid.

In testimony whereof I have hereunto set my hand in the presence of two subscribing witnesses.

EDWARD M. HAMILTON.

Witnesses:
 E. P. BLAKE,
 H. E. WEST.